United States Patent
Suetsugu

(10) Patent No.: US 7,782,736 B2
(45) Date of Patent: Aug. 24, 2010

(54) OPTICAL PICKUP FOR A DISK APPARATUS

(75) Inventor: Masaaki Suetsugu, Osaka (JP)

(73) Assignee: Funai Electric Co., Ltd., Osaka (JP)

( * ) Notice: Subject to any disclaimer, the term of this patent is extended or adjusted under 35 U.S.C. 154(b) by 750 days.

(21) Appl. No.: 11/716,697

(22) Filed: Mar. 12, 2007

(65) Prior Publication Data

US 2007/0211582 A1    Sep. 13, 2007

(30) Foreign Application Priority Data

Mar. 13, 2006    (JP)    ............................ P2006-067029

(51) Int. Cl.
*G11B 7/00*    (2006.01)
(52) U.S. Cl. .............................. 369/112.05; 369/112.01
(58) Field of Classification Search ........................ None
See application file for complete search history.

(56) References Cited

U.S. PATENT DOCUMENTS 4,796,252 A * 1/1989 Maan ........................ 359/819
6,178,155 B1 * 1/2001 Ueda et al. ................... 720/692
6,785,200 B1 * 8/2004 Shiba et al. ............... 369/44.14
2004/0218501 A1 * 11/2004 Sogawa et al. ................ 369/99

FOREIGN PATENT DOCUMENTS

JP    2004-22034    1/2004

* cited by examiner

*Primary Examiner*—Paul Huber
(74) *Attorney, Agent, or Firm*—Morgan, Lewis & Bockius LLP

(57) ABSTRACT

An optical pickup includes: a frame, having a first face formed with a groove, a second face opposite to the first face, a first hole in which a diffraction grating is disposed, and a second hole communicated with the groove and the second face; a spring plate, attached to the first face; and a spring member, including a ring portion disposed in the first hole and abutting on the diffraction grating, a first arm portion extended from an outer peripheral edge of the ring portion and inserted in the groove, and a second arm portion connected to the first arm portion and inserted in the second hole.

4 Claims, 7 Drawing Sheets

PRIOR ART

OPTICAL PICKUP FOR A DISK APPARATUS

CROSS-REFERENCE TO RELATED APPLICATIONS

This application is based upon and claims the benefit of priority from prior Japanese patent application No. 2006-067029, filed on Mar. 13, 2006, the entire contents of which are incorporated herein by reference.

BACKGROUND OF THE INVENTION

The present invention relates to an optical pickup and more particularly to an optical pickup to be used for a disk apparatus (for example, a DVD recorder or a DVD player).

The related art of an optical pickup has been described in JP-A-2004-22034. An example will be described with reference to FIGS. 4 to 7. As shown in FIGS. 4 and 5, a metallic slide base 3 is engaged with a pair of left and right guide rails 2 in a radial direction of a disk D disposed in a housing 1 so as to freely carry out a reciprocation a and b, and a light receiving device PD1 for reading and a light receiving device PD2 for light amount detection which include a photodiode and a laser beam source LD which includes a laser diode are disposed on an erected frame 4 formed integrally with the slide base 3, and furthermore, a polarizing beam splitter PBS, a half mirror HM and an objective lens OL, and a diffraction grating GRT are disposed in the erected frame 4.

An information reading procedure will be described below. A laser beam is emitted from the laser beam source LD through the diffraction grating GRT, the polarizing beam splitter PBS, the half mirror HM and the objective lens OL onto the disk D to be rotated at a high speed, and the reflected light is transmitted through the objective lens OL, the half mirror HM and the polarizing beam splitter PBS and is received by the light receiving device PD1, thereby reading information recorded on the disk D. Moreover, an amount of the light emitted from the laser beam source LD is detected by the light receiving device PD2 and the amount of the light emitted from the laser beam source LD is regulated by a controller of the disk device based on the detection signal.

As shown in FIGS. 6A, 6B, 6C and 7, a grating hole 6 and a pair of concave grooves 7 extended in opposite directions to each other from an outer peripheral edge of the grating hole 6 are formed on a reference end face 4a of the erected frame 4, and the diffraction grating GRT is disposed in the grating hole 6, and there is provided a pressing spring 8 including a ring portion 8a disposed in the grating hole 6 and abutting on the diffraction grating GRT and a pair of arm portions 8b extended in opposite directions to each other from an outer peripheral edge of the ring portion 8a and inserted in the concave grooves 7, and the pressing spring 8 has an overall length r which is small, that is, approximately 8 mm.

The laser beam source LD is attached to the reference end face 4a through a spring plate frame 9 and a holder 10, and the spring plate frame 9 includes a bottom plate 9a to abut on the reference end face 4a and a pair of side plates 9b and 9c which are bent almost perpendicularly from both side edges of the bottom plate 9a, and a laser hole 11 is provided on a center of the bottom plate 9a opposite to the grating hole 6 and an almost U-shaped slit 12 is formed on both ends of the bottom plate 9a so that a residual tongue piece 13 is raised. A communicating hole 15 is provided between the laser hole 11 and each slit 12 in the bottom plate 9a opposite to a through hole 14 of the reference end face 4a, and both ends of the bottom plate 9a are fastened to the reference end face 4a with an adhesive 16 formed of an ultraviolet curing adhesive (or a thermosetting adhesive) so that tips of both arm portions 8b of the pressing spring 8 are pressed by the bottom plate 9a (see FIG. 6B). Consequently, the ring portion 8a is pushed against the diffraction grating GRT by an elastic force which is generated. Thus, it is possible to prevent the diffraction grating GRT from being rotated unexpectedly.

As shown in FIG. 6C, a slot 17 is formed on each of the side plates 9b and 9c and a projection 10a provided on the holder 10 is fitted in the slot 17 so that the laser beam source LD is engaged with the spring plate frame 9 through the holder 10. In FIG. 6C, 18 denotes an operating hole for communicating with the grating hole 6 through the erected frame 4. An operating rod 19 is caused to come in contact with an outer peripheral surface of the diffraction grating GRT through the operating hole 18 to carry out an operation. Consequently, the diffraction grating GRT is rotated to disperse the laser beam as desired.

Description will be given to an assembling procedure. The diffraction grating GRT is inserted into the grating hole 6 in a state in which the reference end face 4a is turned upward, and the ring portion 8a of the pressing spring 8 is then inserted into the grating hole 6, and furthermore, each of the arm portions 8b of the pressing spring 8 is inserted into the concave groove 7 and the bottom plate 9a of the spring plate frame 9 is mounted on the reference end face 4a. The spring plate frame 9 is moved horizontally along the reference end face 4a to finely adjust a directivity of the laser beam emitted from the laser beam source LD, and the spring plate frame 9 is then fastened to the reference end face 4a with the adhesive 16.

With the structure of the related art, the small and light pressing spring 8 is simply put slightly in the grating hole 6. During an assembling work, therefore, a tool hits on the slide base 3 so that the pressing spring 8 jumps out of the grating hole 6 by a shock and is thus lost, for example. In some cases in which the spring plate frame 9 is moved horizontally along the reference end face 4a, moreover, a laser hole 11 of the spring plate frame 9 is caught on a tip of the arm portion 8b of the pressing spring 8 so that the position of the pressing spring 8 is shifted. For this reason, an efficient assembling work is inhibited.

Furthermore, both of the arm portions 8b of the pressing spring 8 abut on the bottom plate 9a of the spring plate frame 9. Therefore, the elastic force of the pressing spring 8 is applied to the bottom plate 9a of the spring plate frame 9 in addition to the contraction and expansion of the adhesive 16 which is caused by a change in an environmental temperature. Consequently, the position of the spring plate frame 9 is shifted so that the directivity of the laser beam emitted from the laser beam source LD might be subtly disordered.

SUMMARY

It is therefore an object of the invention to provide an optical pickup in which an assembling work can efficiently be carried out and a directivity of a laser beam can be prevented from being disordered.

In order to achieve the object, according to the invention, there is provided an optical pickup in which an erected frame is integrally formed with a slide base which is reciprocable in a radial direction of a disk, a grating hole and a pair of concave grooves extended in opposite directions to each other from an outer peripheral edge of the grating hole are formed on a reference end face of the erected frame, a diffraction grating is disposed in the grating hole, there is provided a pressing spring including a ring portion disposed in the grating hole and abutting on the diffraction grating and a pair of arm portions extended in opposite directions to each other from an outer peripheral edge of the ring portion and inserted in each of the concave grooves, there is provided an almost U-shaped spring plate frame including a bottom plate bonded to the reference end face with an adhesive and a pair of side plates bent almost perpendicularly from both side edges of the bottom plate, a laser beam source is attached between the side plates of the spring plate frame through a holder, a laser beam is emitted from the laser beam source onto the disk through the diffraction grating, and a reflected light is received to read information recorded on the disk, wherein a guide hole is formed to penetrate through the erected frame from an inner end of each of the concave grooves, there are provided a pair of guide pieces bent and extended almost perpendicularly from tips of the arm portions and facing the guide holes and a pair of stopper pieces cut out of tips of the guide pieces and protruded obliquely and outward, and each of the guide pieces is inserted into each of the guide holes to engage each of the stopper pieces with a back face of the erected frame.

DETAIL DESCRIPTION OF PREFERRED EMBODIMENTS

Figure 1A:
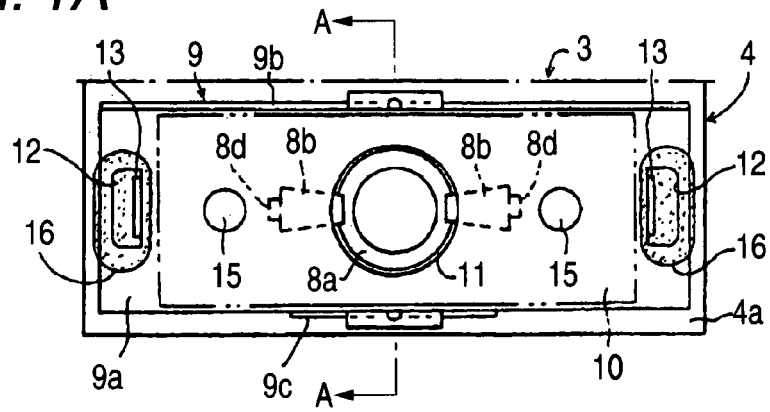
FIG. 1A is a side view showing a part of an optical pickup according to an embodiment of the invention.
Figure 1B:
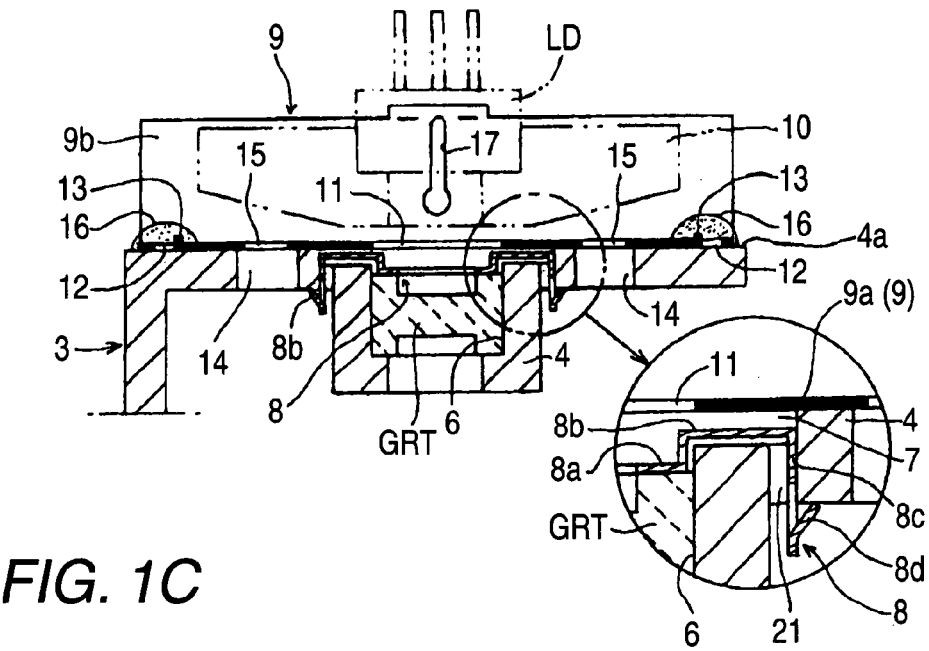
FIG. 1B is a longitudinal sectional view showing the part.
Figure 1C:
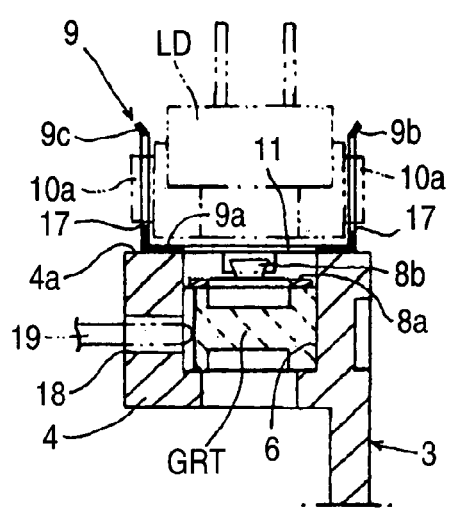
FIG. 1C is a view seen in a direction of an arrow A-A.
Figure 2:
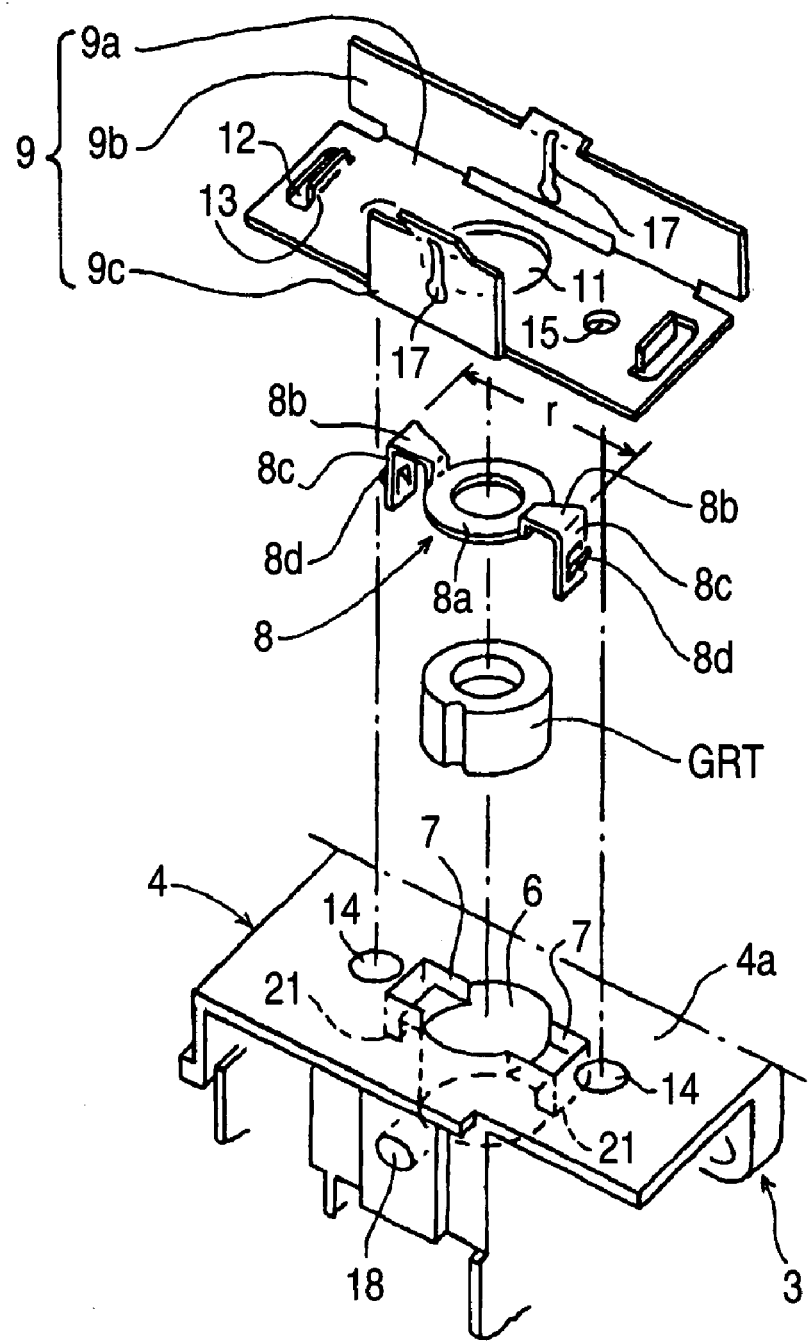
FIG. 2 is an exploded perspective view showing the part.
Figure 3:
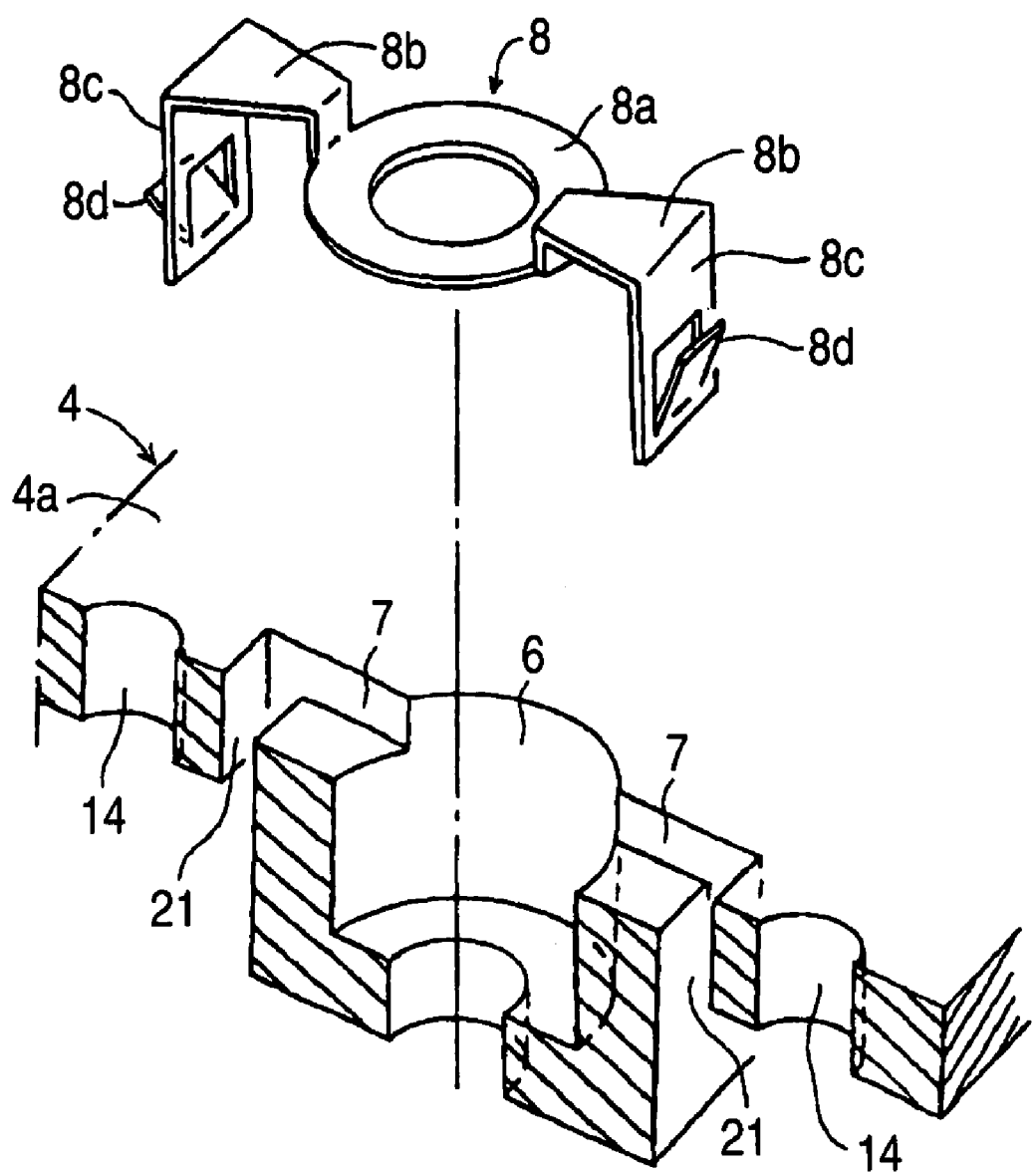
FIG. 3 is an enlarged perspective view showing the part.
Figure 4:
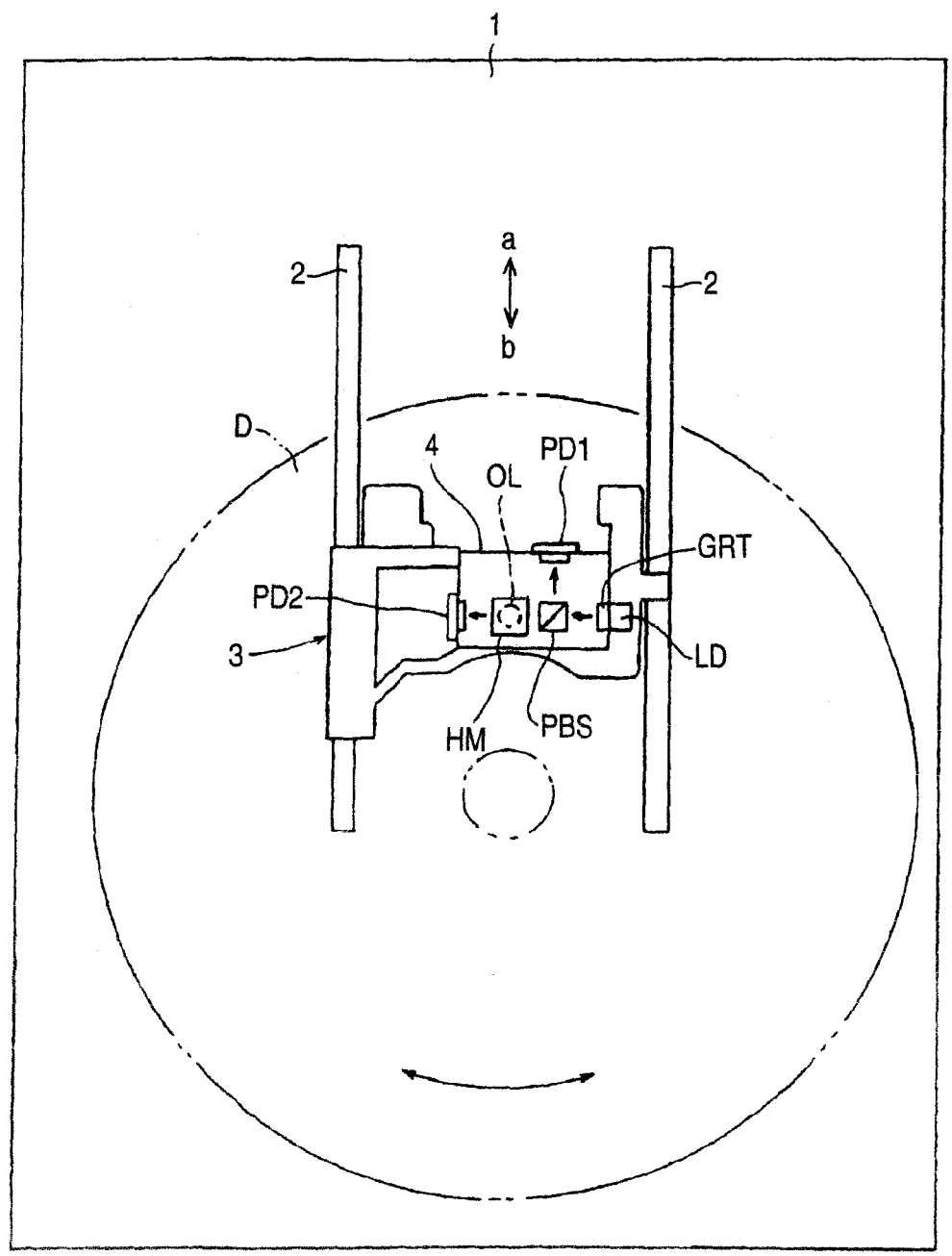
FIG. 4 is a schematic plan view showing a related example.
Figure 5:
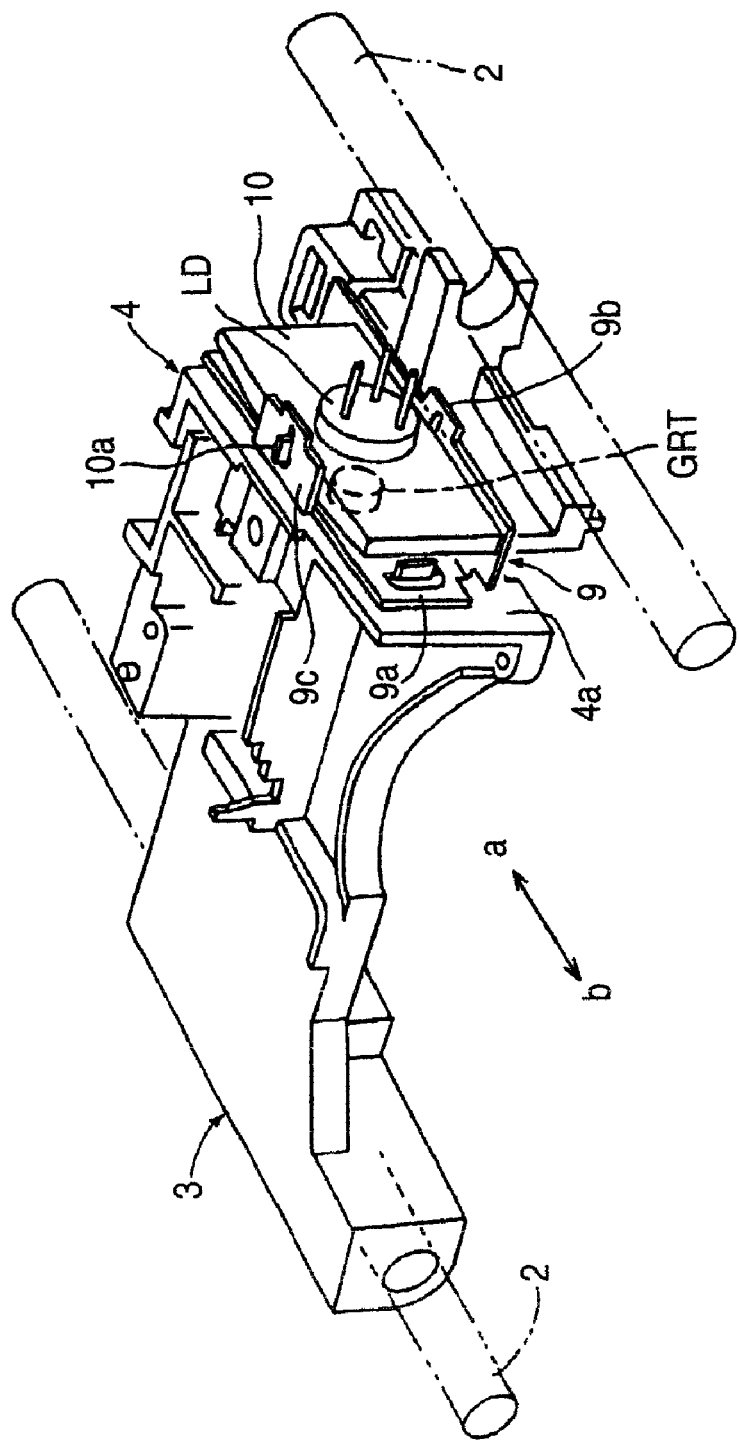
FIG. 5 is a perspective view showing the related example.
Figure 6A:
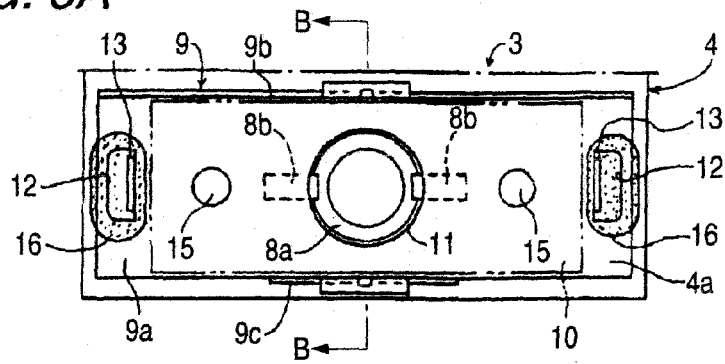
FIG. 6A is a side view showing a part.
Figure 6B:
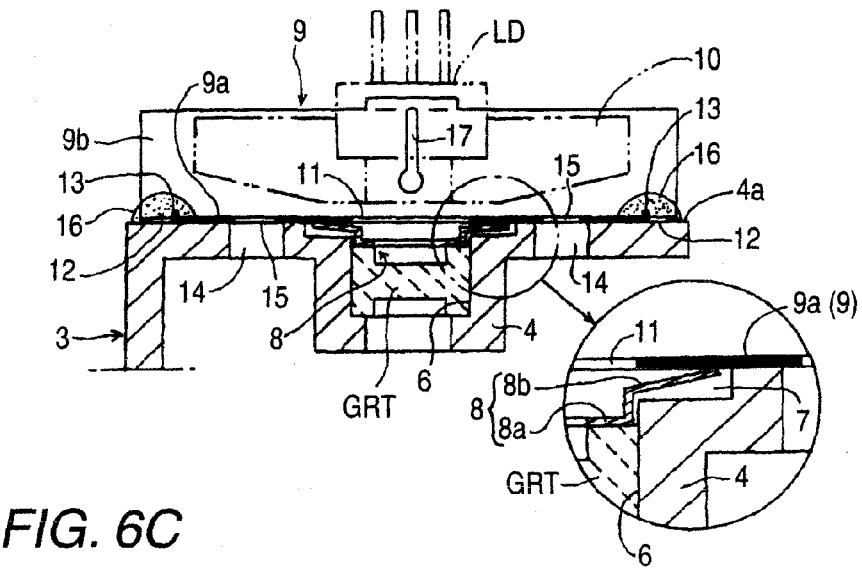
FIG. 6B is a longitudinal sectional view showing the part.
Figure 6C:
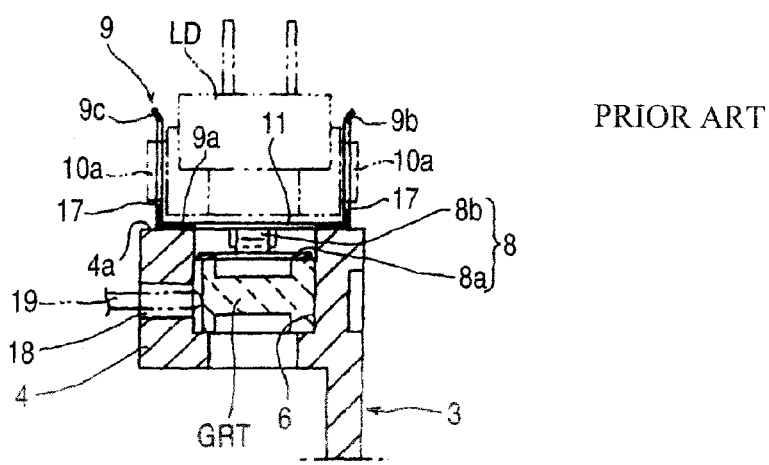
FIG. 6C is a view seen in a direction of an arrow B-B.
Figure 7:
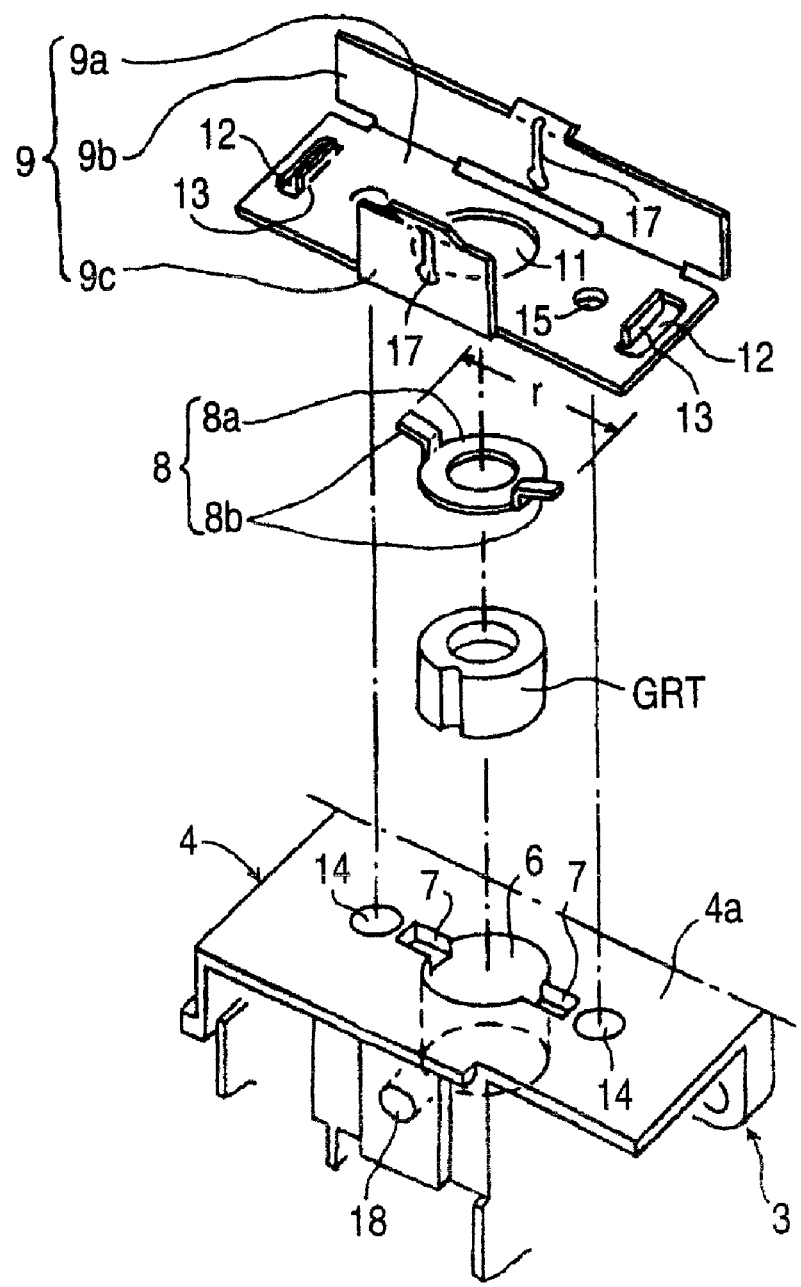
FIG. 7 is an exploded perspective view showing the part.

FIGS. 1A to 3 show a part of an optical pickup according to an embodiment of the invention, and a guide hole 21 is formed to penetrate through an erected frame 4 from an inner end of each concave groove 7, and a pair of guide pieces 8c bent and extended almost perpendicularly from tips of arm portions 8b of a pressing arm 8 and a pair of stopper pieces 8d cut out of tips the guide pieces 8c and protruded obliquely and outward are provided opposite to the guide holes 21. Since the other structures are almost the same as those shown in FIGS. 4 to 7, the same portions have the same reference numerals and description thereof will be omitted.

An assembling procedure will be described. In a state in which a reference end face 4a is turned upward, a diffraction grating GRT is inserted into a grating hole 6. Then, a ring portion 8a of the pressing spring 8 is inserted into the grating hole 6, and furthermore, each guide piece 8c of the pressing spring 8 is inserted into each guide hole 21. Consequently, each stopper piece 8d is engaged with a back face of an erected frame 4 (see FIG. 1B). Next, a bottom plate 9a of a spring plate frame 9 is mounted on the reference end face 4a. The spring plate frame 9 is moved horizontally along the reference end face 4a to finely adjust a directivity of a laser beam emitted from a laser beam source LD. Thereafter, the spring plate frame 9 is fastened to the reference end face 4a with an adhesive 16.

According to the structure, each stopper piece 8d is engaged with (is held in contact with) the back face of the erected frame 4. Therefore, the pressing spring 8 can be reliably engaged so as not to unexpectedly slip from the erected frame 4. Even if a tool hits on a slide base 3 so that the shock is applied to the pressing spring 8, for example, during an assembling work, consequently, the pressing spring 8 can be prevented from jumping out of the grating hole 6 and being lost as in the related art. Moreover, each of the arm portions 8b of the pressing spring 8 is separated from the spring plate frame 9 on the reference end face 4a. Differently from the related art, therefore, a laser hole 11 of the spring plate frame 9 moved horizontally over the reference end face 4a can be prevented from being caught on the pressing spring 8, causing the position of the pressing spring 8 to be shifted. Thus, an assembling work can efficiently be carried out. Furthermore, the ring portion 8a of the pressing spring 8 is pushed against the diffraction grating GRT, thereby generating a predetermined elastic force. Consequently, it is possible to prevent the diffraction grating GRT from being unexpectedly rotated by the elastic force.

In addition, the elastic force of the pressing spring 8 is not applied to the spring plate frame 9. For this reason, it is possible to eliminate a possibility that the position of the spring plate frame 9 might be shifted by the elastic force of the pressing spring 8 as in the related art. Consequently, it is possible to exactly maintain a state in which the directivity of the laser beam emitted from the laser beam source LD is finely adjusted.

While each stopper piece 8d is engaged with (is held in contact with) the back face of the erected frame 4 so that the pressing spring 8 can be prevented from jumping out of the grating hole 6 in the embodiment, it is also possible to employ a structure in which the stopper piece 8d is omitted and the guide piece 8c is caused to elastically come in contact with an inner peripheral surface of the guide hole 21 by the elastic force of the pressing spring 8 so that the pressing spring 8 can be prevented from jumping out of the grating hole 6 by a frictional force generated by the contact.

According to an aspect of the invention, a pair of guide pieces extended from the tips of the arm portions of the pressing spring are inserted into the guide hole penetrating through the erected frame from the inner ends of the concave grooves so that the stopper piece provided on each of the guide pieces is engaged with the back face of the erected frame. Therefore, the pressing spring can be reliably engaged so as not to unexpectedly slip from the erected frame. Even if a tool hits on the slide base so that the shock is applied to the pressing spring, for example, during an assembling work, consequently, the pressing spring can be prevented from jumping out of the grating hole and being lost as in the related art. Moreover, each of the arm portions of the pressing spring is separated from the spring plate frame on the reference end face. Differently from the related art, therefore, the spring plate frame moved horizontally over the reference end face can be prevented from being caught on the pressing spring, causing the position of the pressing spring to be shifted. Thus, an assembling work can efficiently be carried out. Furthermore, the ring portion of the pressing spring is pushed against the diffraction grating, thereby generating a predetermined elastic force. Consequently, it is possible to prevent the diffraction grating from being unexpectedly rotated by the elastic force.

In addition, the elastic force of the pressing spring is not applied to the spring plate frame. For this reason, it is possible to eliminate a possibility that the position of the spring plate frame might be shifted by the elastic force of the pressing spring as in the related art. Consequently, it is possible to exactly maintain a state in which a directivity of a laser beam emitted from the laser beam source is finely adjusted.

According to an aspect of the invention, a pair of guide pieces extended from the tips of the arm portions of the pressing spring are inserted into the guide holes penetrating through the erected frame from the inner ends of the concave grooves so that each of the guide pieces is caused to elastically come in contact with the inner peripheral surface of each of the guide holes by the elastic force of the pressing spring and the pressing spring is engaged with the erected frame by a frictional force generated through the contact. Even if a tool hits on the slide base so that the shock is applied to the pressing spring, for example, during an assembling work, consequently, the pressing spring can be prevented from jumping out of the grating hole and being lost as in the related art. Moreover, each of the arm portions of the pressing spring is separated from the spring plate frame on the reference end face. Differently from the related art, therefore, the spring plate frame moved horizontally over the reference end face can be prevented from being caught on the pressing spring, causing the position of the pressing spring to be shifted. Thus, an assembling work can efficiently be carried out.

What is claimed is:

1. An optical pickup comprising:
    a frame, comprising:
        a first face adapted to oppose a light source of the optical pickup, and being formed with a first hole and a groove communicating with the first hole; and
        a second face opposite to the first face and formed with a second hole communicating with the groove;
    a diffraction grating, disposed in the first hole;
    a spring plate, attached to the first face; and
    a spring member, comprising;
    a ring portion disposed in the first hole and abutting on the diffraction grating;
    a first arm portion extending from the ring portion and extending in the groove; and
    a second arm portion extending from the first arm portion and extending in the second hole toward the second face of the frame.

2. The optical pickup according to claim 1, wherein
the second arm portion is in elastic contact with an inner peripheral surface of the second hole.

3. The optical pickup according to claim 1, wherein
the spring member further comprises a third arm portion, extending from the second arm portion, and being in contact with the second face of the frame.

4. The optical pickup according to claim 1, wherein
the spring member is separated from the spring plate.

* * * * *